C. WALKER.
VALVE.
APPLICATION FILED JULY 10, 1909.
965,129.
Patented July 19, 1910.
2 SHEETS—SHEET 1.
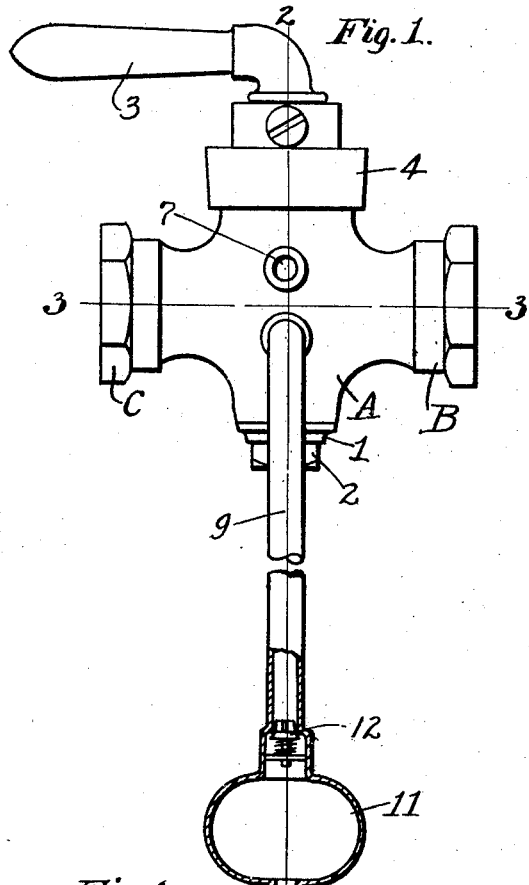
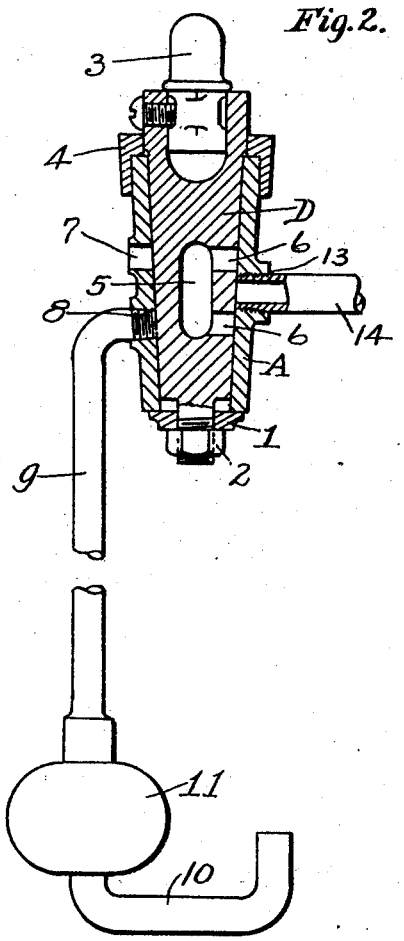
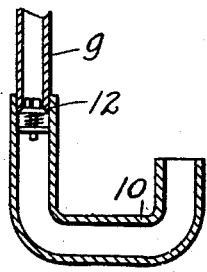
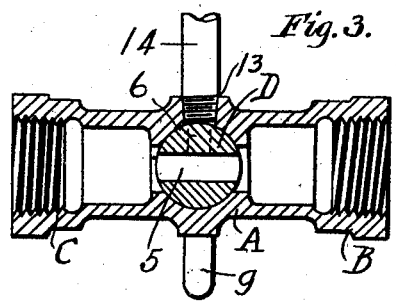
Witnesses,
Carrie R. Ivy
W. Whaley.
Inventor,
Charles Walker
By Cyrus Kehr
Attorney.

C. WALKER.
VALVE.
APPLICATION FILED JULY 10, 1909.
965,129.
Patented July 19, 1910.
2 SHEETS—SHEET 2.
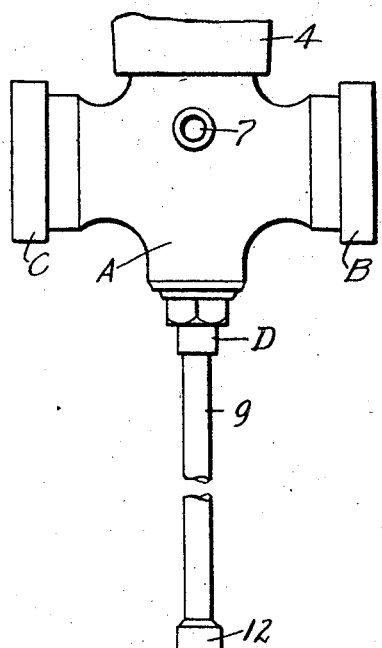
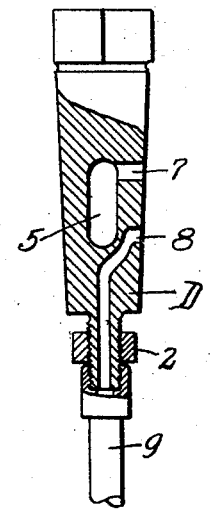
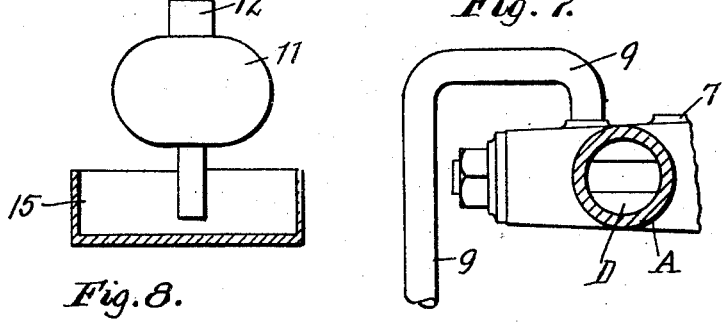
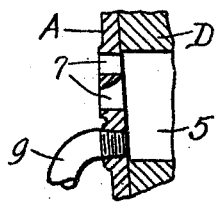
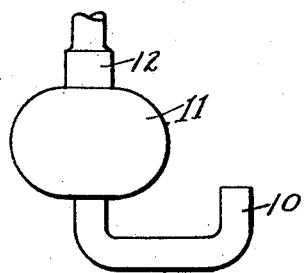
Witnesses,
Inventor,
Charles Walker
By Cyrus Kehr
Attorney.

UNITED STATES PATENT OFFICE.

CHARLES WALKER, OF KNOXVILLE, TENNESSEE.

VALVE.

965,129.  Specification of Letters Patent.  Patented July 19, 1910.

Application filed July 10, 1909. Serial No. 506,868.

*To all whom it may concern:*

Be it known that I, CHARLES WALKER, a citizen of the United States, residing at Knoxville, in the county of Knox and State of Tennessee, have invented a new and useful Improvement in Valves, of which the following is a specification, reference being had to the accompanying drawing.

My improvement relates particularly to that type of valves termed "stop cocks", valves in which a rotatable, conical plug fits into a casing having a conical seat, said plug having an aperture adapted to be turned into the line of flow or to be turned transverse to said flow so that the solid portions of said plug will obstruct the flow.

The object of my invention is to produce a stop cock by means of which all the pipes above and beyond the rotary plug may be drained of water when said plug is turned for cutting off the inflow without opening the faucets.

A further object of the invention is to make provision for simultaneously draining the hot as well as the cold water pipes, including portions which are trapped.

Embodiments of the invention are illustrated in the accompanying drawings.

Figure 1 is a side elevation of a valve embodying my improvement; Fig. 2 is an upright transverse section on the line 2—2 of Fig. 1; Fig. 3 is a horizontal section on the line 3—3 of Fig. 1; Fig. 4 is a view of a modification of the drain pipe; Figs. 5, 6, 7, and 8 illustrate modifications.

Referring to Figs. 1, 2, and 3 of said drawings, A is the usual hollow casing having a tubular branch, B, to which an inflow pipe is to be connected and having a tubular branch, C, to which is to be connected a service pipe leading to any part or parts of a building. The longitudinal opening through said casing is intersected by a transverse conical opening which receives the conical plug, D. The lower end of said plug extends through the casing and is there surrounded by a washer, 1, and a nut, 2. By means of the latter said plug may be drawn closely into said passage, the walls of which form a seat for said plug. At its upper end said plug extends above said casing and is there provided with a laterally directed handle, 3. And above said casing, said plug is surrounded by a suitable cap, 4, which extends a short distance downward around the adjacent portion of the casing. An upright slot, 5, extends horizontally through the plug, D. Said plug may be turned so as to bring said slot into alinement with the openings or passages in the branches, B and C, so as to permit the flow of water through the branch, B, said slot, and the branch, C, into the pipe connected with the latter branch. But when the plug is turned so as to bring said slot transverse to the length of said casing, there is no communication between said slot and the passage through the branch, B, the solid portion of said plug at one side of said slot completely covering said passage. But in the solid portion of the plug at the opposite side of the slot opposite the branch B, the valve being in its cut-off position, are two relatively small horizontal apertures, 6, one being located adjacent the upper and the other adjacent the lower portion of said slot.

In a plane to which the horizontal axis of the casing is perpendicular, and at a level with the upper portion of the slot, 5, an air inlet aperture, 7, is formed in the front side of the casing—the side at the front in Fig. 1. Below said inlet, 7, and at the level of the lower portion of said slot, one end of a pipe, 9, is threaded into an aperture, 8, in said wall of the casing. Said pipe extends thence downward, as shown in the drawings. Its lower end, 10, is turned upward to form a water seal. A little way above said lower end said pipe is expanded to form a bulb chamber, 11, and above said chamber is a check valve, 12, set to resist upward movement of air or water. Opposite said apertures, 7 and 8, and about midway between the upper and lower walls of the slot, 5, an aperture, 13, is formed into the casing, and into said aperture is tapped a drain pipe, 14, which may lead from the lowest points of any pipes or apparatus to be drained simultaneously with the draining of the pipes connected with the branch, C. Said drain pipe, 14, may lead to the lowest points of any water pipes which are "trapped"—bent below an adjacent portion, so that the water can not be drained from it excepting by tapping with another pipe.

Assuming that the plug, D, is turned so as to place the slot, 5, in line with the branches, B and C, for flow, the cutting off of the flow and the draining of the pipes are effected as follows: The plug is turned through one-fourth of the circle so as to bring the apertures, 6, toward the branch, C, and to bring one end of the slot, 5, opposite the aperture, 13, while the solid portion of the plug at one side of said slot extends entirely across the passage of the branch, B, whereby the inflow through said branch is cut off. The water in the slot, 5, and some of the water in the branch, C, and the pipe leading therefrom immediately flows into the pipe, 9, and passes the check valve, 12, and fills the lower end, 10, of said pipe, whereby a water seal is formed in the lower end of said pipe. This passage or course for the heavier fluid being thus formed, the lighter fluid, the air, may enter the inlet, 7, and go thence through the upper aperture, 6, and through the upper portion of the passage in the branch, C, into the upper portion of the pipe leading from said branch. This double flow—the downward flow of the water and the upward flow of the air—is maintained until all the water has escaped from the pipes above the branch, C. During such flow, there is a constant overflow from the end, 10, of the pipe, 9. The check valve resists upward flow when there is upward pressure at the lower end of the pipe, 9.

From the foregoing description it will be apparent that the rate of drainage flow is dependent on the height and consequent weight of the column of water between the lowest discharging point and the air admission point. The lengthening of this column, provided for by the use of the tube 9, results in a more rapid and more certain flow through the discharge 10 than would occur through the opening 8 in the absence of the tube 9. Inasmuch as the body of water remains continuous from the upper end of the column to the lower, there results a rate of flow at the orifice 8 substantially equal to the flow through the discharge 10. It follows from this that when the tube 9 is used the flow past the orifice 7 is more rapid than it would be if the tube 9 were not used. This condition has the double advantage of lessening the tendency to the formation of a film across the aperture 7 and of reducing the lateral outward pressure of the water at the aperture 7 and so facilitating the admission of atmospheric air into the system through the orifice 7, since the pressure tending to force the air into the system is substantially constant. It is also evident that it is desirable to have the tube, 9, completely filled with water during drainage. But there will at times be such a strong inflow of air into the lower end of the tube 9 that the water in said tube will be forced upwardly thus gradually diminishing the vertical distance between the surface of the water in said tube, 9, and said air inlet. The check valve, 12, and the bulb, 11, will allow only a small portion of the tube, 9, to be thus emptied of water and will thus keep the surface of the water in said tube, 9, at a maximum, and almost constant, distance below the air inlet, 7. When the water begins to flow back in the tube, 9, some water will flow through before the check valve becomes seated; but in thus supplying the necessary water to seat the check valve, the surface of water in said tube will be raised only slightly, owing to the relatively large capacity of the bulb, 11.

In Figs. 5 and 6, the pipe, 9, is threaded to the lower end of the plug, D, and the aperture, 8, is extended downward through said plug, so that water entering said aperture will be discharged through the lower end of said plug and the pipe, 9. And in Fig. 5, the laterally directed end, 10, of the pipe, 9, is omitted and said pipe extended into a tank, 15, in which water going downward through said pipe will form a water seal.

The valve may be turned into various positions other than that shown by Figs. 1 and 2; but when the direction of the valve is thus changed, the pipe, 9, must still be directed downward and extended low enough. In Fig. 7, the valve is so turned as to bring the plug, D, into the horizontal position, and the pipe or tube, 9, is bent so as to extend its main portion in the upright position.

In Fig. 8 there are two apertures, 7, one being located above the other, and the wall between the two being tapered upward from below so as to to make a sharp inner edge, the function of which is to aid in breaking the film of water hereinbefore mentioned.

I claim as my invention:

1. In a valve of the nature described, a rotary plug having a transverse slot and an apertured wall at one side of said slot, and a casing having two tubular branches and a transverse passage for said plug and having an air inlet opposite the upper portion of said plug slot and a water outlet passage leading downward from a point opposite the lower portion of said slot, and of a length to provide for a water column of sufficient extent to overcome surface tension at the air inlet, substantially as described.

2. In a valve of the nature described, a rotary plug having a transverse slot and an apertured wall at one side of said slot, and a casing having two tubular branches and a transverse passage for said plug and having an air inlet opposite the upper portion of said plug slot and a water-sealed water outlet passage leading downward from a point opposite the lower portion of said slot, and of a length to provide for a water column of sufficient extent to overcome surface tension at the air inlet, substantially as described.

3. In a valve of the nature described, a rotary plug having a transverse slot and an apertured wall at one side of said slot, and a casing having two tubular branches and a transverse passage for said plug and having an air inlet opposite the upper portion of said plug slot and a water outlet passage leading downward from the point opposite the lower portion of said slot and of a length to provide for a water column of sufficient extent to overcome surface tension at the air inlet the said passage having an upturned end, substantially as described.

4. In a valve of the nature described, a rotary plug having a transverse slot and an apertured wall at one side of said slot, and a casing having two tubular branches and a transverse passage for said plug and having an air inlet opposite the upper portion of said plug slot a water outlet passage leading downward from a point opposite the lower portion of said slot and of a length to provide for a water column of sufficient extent to overcome surface tension at the air inlet and a bulb interposed in said passage, substantially as described.

5. In a valve of the nature described, a rotary plug having a transverse slot and an apertured wall at one side of said slot, and a casing having two tubular branches and a transverse passage for said plug and having an air inlet opposite the lower portion of said plug slot a water-sealed water outlet passage leading downward from a point opposite the lower portion of said slot and of a length to provide for a water column of sufficient extent to overcome surface tension at the air inlet and a bulb interposed in said passage, substantially as described.

6. In a valve of the nature described, a rotary plug having a transverse slot and upper and lower laterally directed openings at one side of the slot, a casing in which the plug is fitted and provided with alining branches, the casing having between said branches an air vent opening to aline with the slot when the plug is in its draining position and a pipe depending from the casing and communicating with the aforesaid lower opening when the plug is in its draining position the pipe being of a length to provide for a water column of sufficient extent to overcome surface tension at the air vent.

7. In a valve of the nature described, a rotary plug having a transverse slot and an apertured wall at one side of said slot, and a casing having two tubular branches and a transverse passage for said plug and having an air inlet opposite the upper portion of said plug slot a water outlet passage leading downward from a point opposite the lower portion of said slot and of a length to provide for a water column of sufficient extent to overcome surface tension at the air inlet and a check valve interposed in said passage, substantially as described.

8. In a valve of the nature described, a rotary plug having a transverse slot and an apertured wall at one side of said slot, and a casing having two tubular branches and a transverse passage for said plug and having an air inlet opposite the upper portion of said plug slot a water-sealed water outlet passage leading downward from a point opposite the lower portion of said slot and of a length to provide for a water column of sufficient extent to overcome surface tension at the air inlet and a check valve interposed in said passage, substantially as described.

9. In a valve of the nature described, a rotary plug having a transverse slot and an apertured wall at one side of said slot, and a casing having two tubular branches and a transverse passage for said plug and having an air inlet opposite the upper portion of said plug slot a water outlet passage leading downward from the point opposite the lower portion of said slot and of a length to provide for a water column of sufficient extent to overcome surface tension at the air inlet, the said passage having an upturned end and a check valve interposed in said passage, substantially as described.

10. In a valve of the nature described, a rotary plug having a transverse slot and an apertured wall at one side of said slot, and a casing having two tubular branches and a transverse passage for said plug and having an air inlet opposite the upper portion of said plug slot a water outlet passage leading downward from a point opposite the lower portion of said slot and of a length to provide for a water column of sufficient extent to overcome surface tension at the air inlet, and a bulb and a check valve interposed in said passage, substantially as described.

11. In a valve of the nature described, a rotary plug having a transverse slot and an apertured wall at one side of said slot, and having two tubular branches and a transverse passage for said plug and having an air inlet opposite the upper portion of said plug slot a water-sealed water outlet passage leading downward from a point opposite the lower portion of said slot and of a length to provide for a water column of sufficient extent to overcome surface tension at the air inlet, and a bulb and a check valve interposed in said passage, substantially as described.

12. In a valve of the nature described, a rotary plug having a transverse slot and an apertured wall at one side of said slot, and a casing having two tubular branches and a transverse passage for said plug and having an air inlet opposite the upper portion of said plug slot a water outlet passage leading downward from the point opposite the lower portion of said slot and of a length to provide for a water column of sufficient extent to overcome surface tension at the air inlet, the said passage having an upturned end and a bulb and a check valve interposed in said passage, substantially as described.

13. In a valve of the nature described, a rotary plug having a transverse slot and an apertured wall at one side of said slot, and a casing having two tubular branches and a transverse passage for said plug and having an air inlet opposite the upper portion of said plug slot and a water outlet adjacent said air inlet, and a pipe leading downward from said water outlet and water-sealed at its lower end, the pipe being of a length to provide for a water column of sufficient extent to overcome surface tension at the air inlet, substantially as described.

14. In a valve of the nature described, a rotary plug having a transverse slot and an apertured wall at one side of said slot, and a casing having two tubular branches and a transverse passage for said plug and having an air inlet opposite the upper portion of said plug slot and a water outlet adjacent said air inlet, and a pipe leading downward from said water outlet and having its lower end upturned to form a water-seal, the pipe being of a length to provide for a water column of sufficient extent to overcome surface tension at the air inlet, substantially as described.

15. In a valve of the nature described, a rotary plug having a transverse slot and an apertured wall at one side of said slot, and a casing having two tubular branches and a transverse passage for said plug and having an air inlet opposite the upper portion of said plug slot and a water outlet adjacent said air inlet, and a pipe leading downward from said water outlet and water-sealed at its lower end and having a bulb, the pipe being of a length to provide for a water column of sufficient extent to overcome surface tension at the air inlet, substantially as described.

16. In a valve of the nature described, a rotary plug having a transverse slot and an apertured wall at one side of said slot, and a casing having two tubular branches and a transverse passage for said plug and having an air inlet opposite the upper portion of said plug slot and a water outlet adjacent said air inlet, and a pipe leading downward from said water outlet and water-sealed at its lower end and having a check valve, the pipe being of a length to provide for a water column of sufficient extent to overcome surface tension at the air inlet, substantially as described.

17. In a valve of the nature described, a rotary plug having a transverse slot and an apertured wall at one side of said slot, and a casing having two tubular branches and a transverse passage for said plug and having an air inlet opposite the upper portion of said plug slot and a water outlet adjacent said air inlet, and a pipe leading downward from said water outlet and water-sealed at its lower end and having a check valve and a bulb, the pipe being of a length to provide for a water column of sufficient extent to overcome surface tension at the air inlet, substantially as described.

18. In a valve of the nature described, a rotary plug having a transverse slot and an apertured wall at one side of said slot, and a casing having two tubular branches and a transverse passage for said plug and an air inlet opposite the upper portion of said plug slot and a water outlet passage opposite the lower portion of said slot, and a water inlet in the side of the casing opposite said air inlet and said water outlet passage, the latter being of a length to provide for a water column of sufficient extent to overcome surface tension at the air inlet, substantially as described.

19. In a valve of the nature described, a rotary plug having a transverse slot and an apertured wall at one side of said slot, and a casing having two tubular branches and a transverse passage for said plug and having an air inlet opposite the upper portion of said plug slot and a water outlet passage leading downward from a point opposite the lower portion of said slot and a water inlet in the wall opposite said air inlet and water outlet passage, the latter being of a length to provide for a water column of sufficient extent to overcome surface tension at the air inlet, substantially as described.

20. In a valve of the nature described, a rotary plug having a transverse slot and an apertured wall at one side of said slot, and a casing having two tubular branches and a transverse passage for said plug and having a water outlet passage leading downward from a point opposite the lower portion of said slot and having two air inlet apertures above said water outlet passage, the latter being of a length to provide for a water column of sufficient extent to overcome surface tension at the air inlet, substantially as described.

21. In a valve of the nature described, a rotary plug having a transverse slot and an apertured wall at one side of said slot, and a casing having two tubular branches and a transverse passage for said plug and having a water outlet passage leading downward from a point opposite the lower portion of said slot and having two apertures above said water outlet, the wall between said apertures coming to an edge at the inner face of the casing, substantially as described.

22. In a valve of the nature described, a rotary plug having a transverse slot and an apertured wall at one side of said slot, and a casing having two tubular branches and a transverse passage for said plug and having three apertures opposite the upper portion of said plug slot, substantially as described.

23. In a valve of the nature described, a rotary plug having a transverse slot and an apertured wall at one side of said slot, and a casing having two tubular branches and a transverse passage for said plug and having three apertures opposite the upper portion of said plug slot, the wall between said apertures coming to an edge at the inner face of the casing, substantially as described.

24. In a drain valve, the combination with a casing having inlet and outlet branches and having an air vent, of a valve fitted in the casing to control the communication of said branches and having a draining position wherein it shuts off the communication of the branches and puts the outlet branch in communication with the vent opening, the valve having also an opening through which the water drains from the outlet branch, when the valve is in its closed position, and a pipe depending from the valve and in communication with the drain opening, the pipe being of a length to provide for a water column of sufficient extent to overcome surface tension at the air vent.

In testimony whereof I have signed my name, in presence of two witnesses, this third day of July, in the year one thousand nine hundred and nine.

CHARLES WALKER.

Witnesses:
W. L. SMITH,
CYRUS KEHR.